US012398739B2

(12) United States Patent
Chauhan (10) Patent No.: US 12,398,739 B2
(45) Date of Patent: Aug. 26, 2025

(54) MECHANICALLY LOCKING ACTUATOR (71) Applicant: SAFRAN LANDING SYSTEMS UK LTD., Gloucester (GB)

(72) Inventor: Manish Chauhan, Cheltenham (GB)

(73) Assignee: SAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 18/560,070

(22) PCT Filed: Apr. 22, 2022

(86) PCT No.: PCT/GB2022/051034
§ 371 (c)(1),
(2) Date: Nov. 9, 2023

(87) PCT Pub. No.: WO2022/238675
PCT Pub. Date: Nov. 17, 2022

(65) Prior Publication Data
US 2024/0240655 A1 Jul. 18, 2024

(30) Foreign Application Priority Data
May 10, 2021 (GB) .................................. 2106628

(51) Int. Cl.
*F15B 15/26* (2006.01)
*B64C 25/32* (2006.01)
(Continued)

(52) U.S. Cl.
CPC ........ *F15B 15/261* (2013.01); *F03G 7/06145* (2021.08); *F15B 15/16* (2013.01);
(Continued)

(58) Field of Classification Search
CPC .............................. F15B 15/16; F15B 15/261
See application file for complete search history.

(56) References Cited

U.S. PATENT DOCUMENTS 3,831,901 A * 8/1974 Williams .................. B66F 3/28
92/15
6,404,098 B1 6/2002 Kayama et al.
(Continued)

FOREIGN PATENT DOCUMENTS

DE 19806501 C1 8/1999
EP 1045141 A2 10/2000
WO 2011/113857 A1 9/2011

OTHER PUBLICATIONS

Examination Report received for GB Patent Application No. 2106628.7, mailed on Jul. 7, 2023, 3 pages.
(Continued)

*Primary Examiner* — Michael Leslie
(74) *Attorney, Agent, or Firm* — WOMBLE BOND DICKINSON (US) LLP (57) ABSTRACT A lockable telescopic actuator arranged to be in a locked state or in an unlocked state, the lockable telescopic actuator including: a body defining a cylindrical cavity; a piston mounted to slide in the cylindrical cavity; and a locking mechanism including a first locking segment arranged to move from a locked position to an unlocked position. In the locked position the first locking segment is engaged with the piston to prevent the piston from moving. In the unlocked position the first locking segment is disengaged from the piston to allow the piston to move. A first shape memory alloy, SMA, biasing element configured to be extended or compressed such that when the first SMA biasing element is compressed the first locking element is biased into the locked position and when the first SMA bias element is extended the first locking element is biased into the unlocked position.

18 Claims, 3 Drawing Sheets (51) Int. Cl.
*F03G 7/06* (2006.01)
*F15B 15/16* (2006.01)

(52) U.S. Cl.
CPC .............. *F15B 15/26* (2013.01); *B64C 25/32* (2013.01); *F16F 2224/0258* (2013.01)

(56) References Cited

U.S. PATENT DOCUMENTS

| | | |
|---|---|---|
| 9,046,082 B2 * | 6/2015 | Jee .......................... F03G 7/065 |
| 11,524,737 B2 * | 12/2022 | Sakagawa .............. B62K 19/36 |
| 12,037,805 B2 * | 7/2024 | Strippoli ................. E04H 12/34 |
| 2005/0230195 A1 | 10/2005 | Jones et al. |
| 2014/0352289 A1 | 12/2014 | Riedel et al. |
| 2018/0186446 A1 | 7/2018 | Schmidt |

OTHER PUBLICATIONS

International Search Report and Written Opinion received for PCT Patent Application No. PCT/GB2022/051034, mailed on Jul. 6, 2022, 15 pages.

Search Report received for GB Patent Application No. 2106628.7, mailed on Oct. 21, 2021, 4 pages.

\* cited by examiner

MECHANICALLY LOCKING ACTUATOR

BACKGROUND OF THE INVENTION

Telescopic actuators are commonly used in airspace or other mechanical applications and generally comprise a cylinder or a body defining a cylindrical cavity and a piston or rod, which is slidably mounted to the body. There is often a need for telescopic actuators to be selectively lockable, i.e., to be configured such that in a first, locked, state the piston is prevented from moving relative to the body, while in a second, unlocked, state the piston is allowed to move relative to the body. It is generally desired to ensure that a lockable actuator will not prematurely transition from the locked state to the unlocked state or vice versa.

In known lockable actuators, to ensure that there will be no premature transition between the locked and the unlocked state, the systems often rely on a resistive force, i.e., a frictional force, that needs to be overcome for locking and unlocking by spring and/or hydraulic systems. This can cause excessive wear of parts and may lead to higher maintenance requirements, impacting cost, reliability and potentially safety.

There is thus a need for an improved lockable actuator that can reliably prevent an unwanted transition from a locked state to an unlocked state.

SUMMARY OF THE INVENTION

According to a first aspect of the invention there is provided a lockable telescopic actuator arranged to be in a locked state or in an unlocked state, the lockable telescopic actuator comprising: a body defining a cylindrical cavity; a piston mounted to slide telescopically in the cylindrical cavity; and a locking mechanism comprising a first locking segment, the first locking segment arranged to move from a locked position to an unlocked position, wherein in the locked position the first locking segment is engaged with the piston to prevent the piston from moving relative to the body and in the unlocked position the first locking segment is disengaged from the piston to allow the piston to move relative to the body; and a first shape memory alloy, SMA, biasing element configured to be selectively extended or compressed, the first SMA biasing element arranged such that when the first SMA biasing element is selectively compressed the first locking element is biased into the locked position and when the first SMA bias element is selectively extended the first locking element is biased into the unlocked position.

Advantageously, the invention reduces wear in components of the actuator, as it does not have to rely on friction between the locking segments and the piston to maintain the locked or unlocked state. Furthermore, the invention requires fewer moving parts than known purely mechanical locking mechanisms, and thus enjoy improved reliability, reduced weight, and easier maintenance when compared with known lockable telescopic actuators.

According to a second aspect of the invention there is provided a lockable telescopic actuator arranged to be in a locked state or in an unlocked state, the lockable telescopic actuator comprising: a body defining a cylindrical cavity; a piston mounted to slide telescopically in the cylindrical cavity; and a locking mechanism comprising a first locking segment, the first locking segment arranged to move from a locked position to an unlocked position, wherein in the locked position the first locking segment is engaged with the piston to prevent the piston from moving relative to the body and in the unlocked position the first locking segment is disengaged from the piston to allow the piston to move relative to the body; and a first shape memory alloy, SMA, biasing element configured to be selectively extended or compressed, the first SMA biasing element arranged such that when the first SMA biasing element is selectively extended the first locking element is biased into the locked position and when the first SMA bias element is selectively compressed the first locking element is biased into the unlocked position.

BRIEF DESCRIPTION OF THE DRAWINGS

Embodiments of the invention will now be described, by way of non-limiting examples only, with reference to the following accompanying figures, in which.

DETAILED DESCRIPTION OF EMBODIMENTS OF THE INVENTION

The present invention relates to a lockable telescopic actuator, comprising a cylinder or a body defining a cylindrical cavity and a piston or a rod, the piston or rod mounted to slide telescopically in the cylindrical cavity, the lockable telescopic actuator further comprising a locking mechanism arranged to be in a locked state or in an unlocked state. When the lockable telescopic actuator is in a locked state the piston is prevented from moving relative to the body. When the lockable telescopic actuator is in the unlocked state the piston is allowed to move relative to the body. A lockable telescopic actuator according to the invention can be incorporated in an landing gear for an aircraft, or in other components of an aircraft.

Shape Memory Alloys, SMAs, are a type of materials with the ability to return to a predefined shape after experiencing plastic deformation. SMAs revert back to their predefined shape by heating, cooling, or some other external stimulus as long as the experienced deformation is within a recoverable range. The process of deformation and shape recovery can be repeated many times.

SMAs undergo temperature driven phase transformation. Temperature change may be achieved by applying a current to the SMA, which due to the resistivity of the SMA can result in heating of the SMA. In some embodiments of the invention, the SMA is nickel-titanium allot or Nitinol that has an appropriate resistivity for such applications. As the SMA changes temperature due to heating or cooling the crystal structure of the SMA changes which results in dimensional changes that can range between 1% and 8%. This can result in the SMA element extending or compressing depending on its temperature.

The SMA biasing elements discussed below may be electrically coupled to a current source (not shown in the following figures) to receive current. When current flows through any of the SMA biasing elements mentioned below, due to the resistivity of the SMA, the SMA may be heated to a first predefined temperature, at which point the SMA may have a first size or length. When current does not flow through the SMA, the SMA cools, at which point the SMA may have a second size or length. As such each SMA discussed later can be extended or compressed selectively, by heating or cooling the SMA.

Figure 1A:
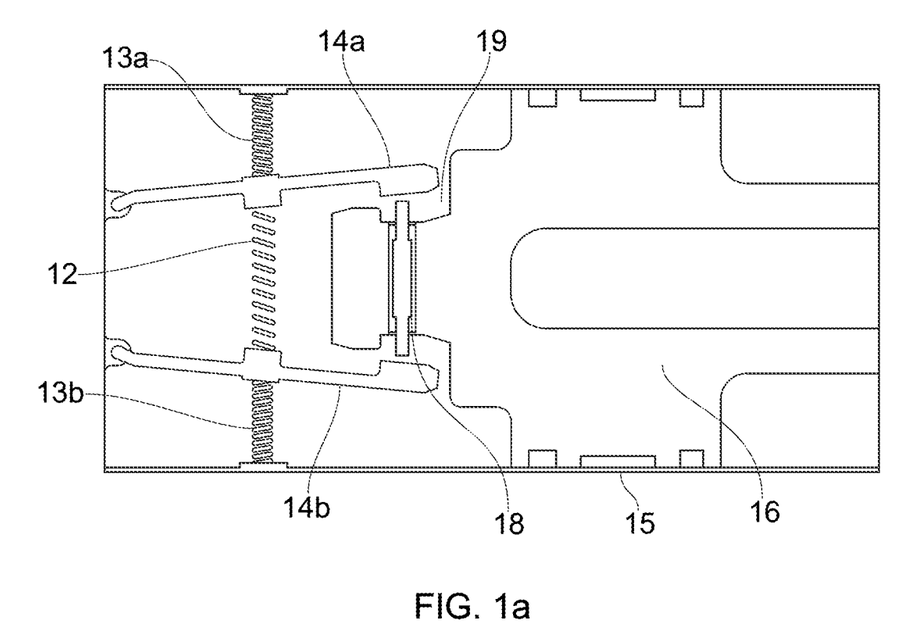
FIG. 1a is a schematic cross sectional diagram of an internally locking telescopic actuator with shape memory alloy in an unlocked state.
Figure 1B:
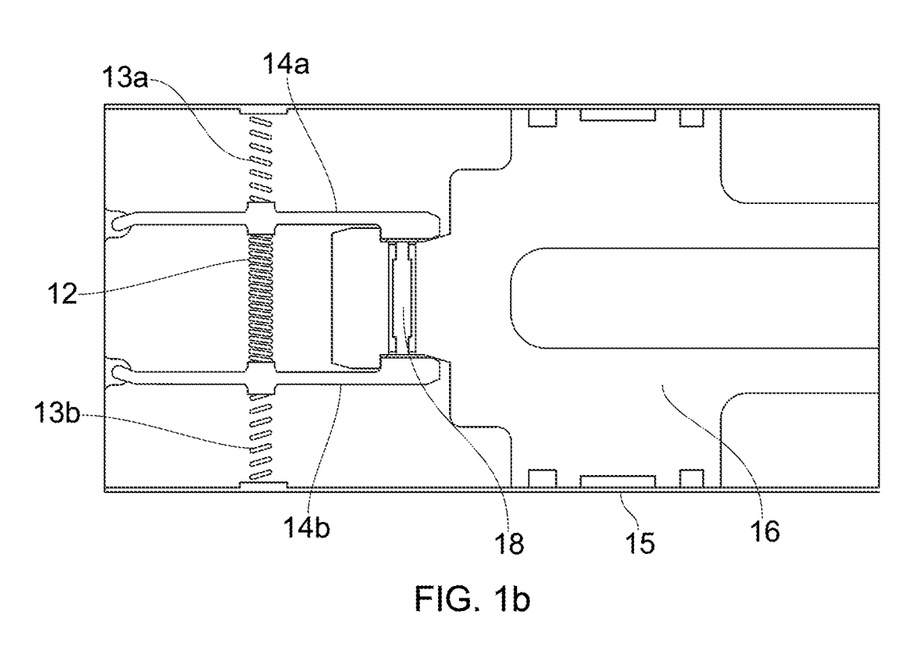
FIG. 1b is a schematic cross sectional diagram of an internally locking telescopic actuator with shape memory alloy in a locked state.

FIG. 1a schematically illustrates a cross sectional view of a telescopic actuator according to an embodiment of the invention, illustrated in the unlocked state. FIG. 1b illustrates the same actuator of FIG. 1a in the locked state.

The telescopic actuator 10 comprises a piston 16 mounted to slide telescopically in the cylindrical cavity of the body 15, commonly known as a sliding piston. The piston 16 may comprise dynamic seals 17 on a surface to reduce the possibility of leaking of gas or fluids contained in the telescopic actuator.

The telescopic actuator 10 comprises a locking mechanism. The locking mechanism comprises a first locking segment 14a, a second locking segment 14b, and a first shape memory alloy, SMA, biasing element 12. In the embodiment described in FIGS. 1a and 1b, the first locking segment 14a and the second locking segment 14b are shaped as rocking claws that may form jaws, although in other embodiments they may have different shapes as will be shown later in the present description. The first locking segment 14a and the second locking segment 14b are respectively attached on one side through hinges in the cylindrical cavity of the body 15 and arranged to pivot about each respective hinge.

The piston 16 comprises on its surface at least one recess or slot 19. In the embodiment illustrated in FIGS. 1a and 1b the first locking segment 14a and the second locking segment 14b are arranged to pivot about their respective hinges such that they can at least partially enter the recess 19 or be entirely out of the recess 19. In a first state when the first locking segment 14a and/or the second locking segment 14b are at least partially inserted in the recess 19 the piston is prevented from moving relative to the body. In this first state the first locking segment 14a and/or the second locking segment 14b are in a locked position and the lockable telescopic actuator is in a locked state. In a second state when the first locking segment 14a and the second locking segment 14b are entirely out of the recess 19 the piston is allowed to move relative to the body. In the second state the first locking segment 14a and/or the second locking segment 14b are in an unlocked position and the lockable telescopic actuator is in an unlocked state.

The telescopic actuator illustrated in FIGS. 1a and 1b also comprises a first SMA biasing element configured to be selectively extended or compressed. The first SMA is positioned between the first locking element 14a and the second locking element 14b.

When the first SMA is selectively compressed the first locking element 14a and the second locking element 14b are biased such that they are in the locked position. In other words when the first SMA is selectively compressed first SMA applies to the first locking element 14a and the second locking element 14b a force such that the first locking element 14b and the second locking element 14b pivot about their respective hinges towards the recess until the first locking element 14a and the second locking element 14b are at least partially inserted in the recess 19 and the telescopic actuator is, as shown in FIG. 1b.

When the first SMA biasing element 12 is selectively extended the first locking element 14a and the second locking element 14b are biased such that they are in the unlocked position. In other words, when the first SMA is selectively extended, first SMA applies to the first locking element 14a and the second locking element 14b a force such that the first locking element 14a and the second locking element 14b pivot about their respective hinges away from the recess, until the first locking element 14a and the second locking element 14b are out of the recess 19 and the telescopic actuator is as shown in FIG. 1a.

The telescopic actuator illustrated in FIGS. 1a and 1b may also comprise a second SMA biasing element 13a and a third SMA biasing element 13b configured to be selectively extended or compressed. The second SMA biasing element 13a is located in the cylindrical cavity and positioned between the first locking element 14a and the body. The third SMA biasing element 13b is located in the cylindrical cavity and positioned between the second locking element 14b and the body.

When the first SMA biasing element 12 is selectively extended the second SMA biasing element 13a is selectively compressed. Thus, when the first SMA biasing element 12 applies a force to the first locking segment 14a to move the first locking segment 14a to the unlocked position, the second SMA biasing element 13a also applies a force to the first locking segment 14a to move the first locking segment 14a to the unlocked position. Similarly, when the first SMA biasing element 12 is selectively compressed the second SMA biasing element 13a is selectively extended. Thus, when the first SMA biasing element 12 applies a force to the first locking segment 14a to move the first locking segment 14a to the locked position, the second SMA biasing element 13a also applies a force to the first locking segment 14a to move the first locking segment 14a to the locked position. Advantageously, relying on two SMA biasing springs to move the first locking segment allows higher locking loads to be achieved and improved reliability.

Similarly, when the first SMA biasing element 12 is selectively extended the third SMA biasing element 13b is selectively compressed. Thus, when the first SMA biasing element 12 applies a force to the second locking segment 14b to move the second locking segment 14b to the unlocked position, the third SMA biasing element 13b also applies a force to the second locking segment 14b to move the second locking segment 14b to the unlocked position. Similarly, when the first SMA biasing element 12 is selectively compressed the third SMA biasing element 13b is selectively extended. Thus, when the first SMA biasing element 12 applies a force to the second locking segment 14b to move the second locking segment 14b to the locked position, the third SMA biasing element 13b also applies a force to the second locking segment 14b to move the second locking segment 14b to the locked position. As in the case of the first SMA biasing element 12 and the second biasing element 13a, relying on two SMA biasing springs to move the second locking segment 14b allows higher locking loads to be achieved and improved reliability.

Although the embodiment illustrated in FIGS. 1a and 1b comprises the first, second and third SMA biasing elements 12, 13a and 13b, other embodiments may comprise only the first SMA biasing element 12. Yet, even other embodiments may lack the first SMA biasing element 12 but have the second and/or the third SMA biasing elements 13a and 13b. Furthermore, other embodiments may have only the first locking segment 14a and lack a further locking element, in which case the first SMA biasing element 12 may be between the first locking segment 14a and the body 15.

In some embodiments of the invention, the telescopic actuator may comprise multiple locking mechanisms, each comprising respective rocking claws disposed radially with respect to the longitudinal axis of the piston.

In operation, the telescopic actuator may initially be in an unlocked state as described above when a controller (not shown) enables a current source (not shown) to provide a first current to the first SMA biasing element 12 such that the first SMA biasing element 12 is maintained at a predefined first temperature, while providing a second current to the second and third SMA biasing elements 13a, 13b such that the second and third SMA biasing elements 13a, 13b are maintained at a predefined second temperature. At the predefined first temperature the first SMA biasing element 12 is extended and at the predefined second temperature the second and third SMA biasing elements 13a, 13b are compressed, thus biasing the first and second locking segments 14a, 14b in the unlocking position and allowing the piston 26 to move relative to the body 25.

When there is a need to lock the telescopic actuator the controller enables the current source to provide a predefined third current to the first SMA biasing element 12, wherein the third current is less than the first current, such that the first SMA biasing element 12 is cooled to a predefined third temperature, while providing a fourth current to the second and third SMA biasing elements 13a, 13b, wherein the fourth current is greater than the second current such that the second and third SMA biasing elements 13a, 13b are heated to a predefined fourth temperature. The cooling of the first SMA biasing element 12 causes the first SMA biasing element 12 to compress, while the heating of the second and third SMA biasing elements 13a, 13b cause the second and third SMA biasing elements 13a, 13b to extend, biasing the first and second locking segments 14a, 14b in the locking position and preventing the piston 26 to move relative to the body 25.

When there is a need to unlock the telescopic actuator, the controller enables the current source to provide to the first SMA biasing element 12 the first current, thus extending the first SMA biasing element 12, and to provide the second and third SMA biasing elements 13a, 13b the second current, thus compressing the second and third SMA biasing elements 13a, 13b. Extending the first SMA biasing element 12 and compressing the second and third SMA biasing elements 13a, 13b biases the first and second locking segments 14a, 14b back to the unlocked position, allowing the piston 26 to move relative to the body 25.

The piston 16 illustrated in FIGS. 1a and 1b may comprise an indicator switch 18 in the recess 19. The indicator switch 18 is configured to be activated when in contact with the first and/or second locking segments 14a, 14b and deactivated when the first and second locking segments are out of the recess 19. In other embodiments, the indicator switch 18 may be configured to be deactivated when in contact with the first and/or second locking segments 14a, 14b and activated when the first and second locking segments are out of the recess 19. The indicator switch 18 may be part of a feedback mechanism (not shown) that comprises the current source, thus providing a single centralised system that verifies that the heating or cooling of the SMA has reached the desired levels based on the output of the indicator switch 18 that provides feedback of whether the telescopic actuator is in the locked state or in the unlocked state.

Advantageously, as each of the SMA biasing elements can separately bias the locking segments between the locked and the unlocked position, the actuator benefits from improved redundancy and reliability. In other words, even if the first SMA biasing element 12 fails, the second and third SMA biasing element 13a and 13b will still be able to move the first and second locking segments 14a, 14b to engage or disengage with the piston 16, and vice versa.

Although in the telescopic actuator illustrated in FIGS. 1a and 1b the cooling of the first SMA biasing element 12 causes the first SMA biasing element 12 to compress, while the heating of the second and third SMA biasing elements 13a, 13b causes the second and third SMA biasing elements 13a, 13b to extend, in other embodiments the SMA biasing elements may arranged such that the heating of the first SMA biasing element 12 would cause the first SMA biasing element 12 to compress, while the cooling of the second and third SMA biasing elements 13a, 13b would cause the second and third SMA biasing elements 13a, 13b to extend, or in other words the opposite behaviour to the telescopic actuator illustrated in FIGS. 1a and 1b. Yet, in other embodiments, the first SMA biasing element 12 and the second and third SMA biasing elements 13a, 13b may comprise different SMA, such that the cooling of all of the first SMA biasing element 12 and the second and third SMA biasing elements 13a, 13b causes the first SMA biasing element 12 to compress and the third SMA biasing elements 13a, 13b to extend, or alternatively, the heating of all of the first SMA biasing element 12 and the second and third SMA biasing elements 13a, 13b causes the first SMA biasing element 12 to compress and the third SMA biasing elements 13a, 13b to extend. The skilled person will readily understand that based on the arrangement of the SMA biasing elements different combination of SMAs can be employed to bias the telescopic actuator to the locked or unlocked position for a variety of temperatures.

Figure 2A:
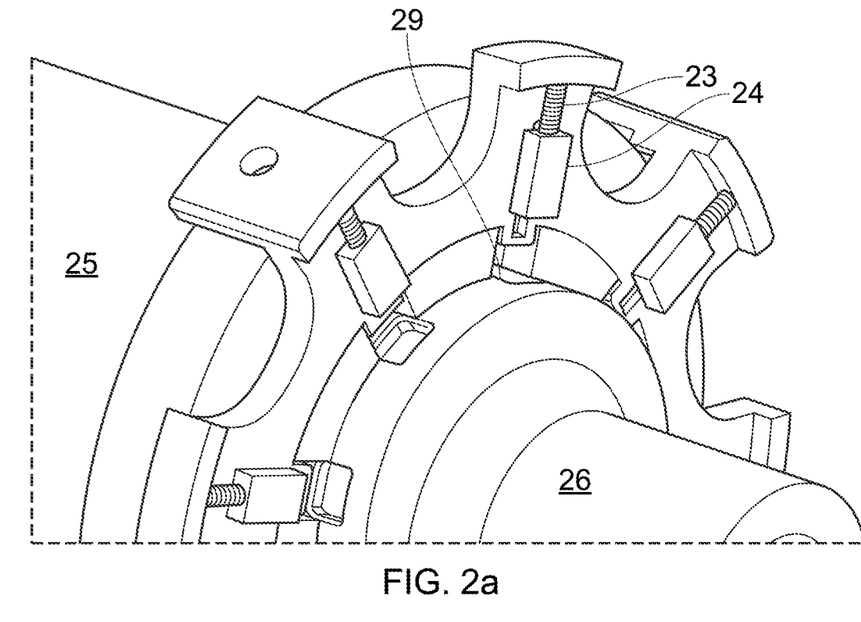
FIG. 2a is a partial perspective schematic diagram of an externally locking telescopic actuator in an unlocked state.
Figure 2B:
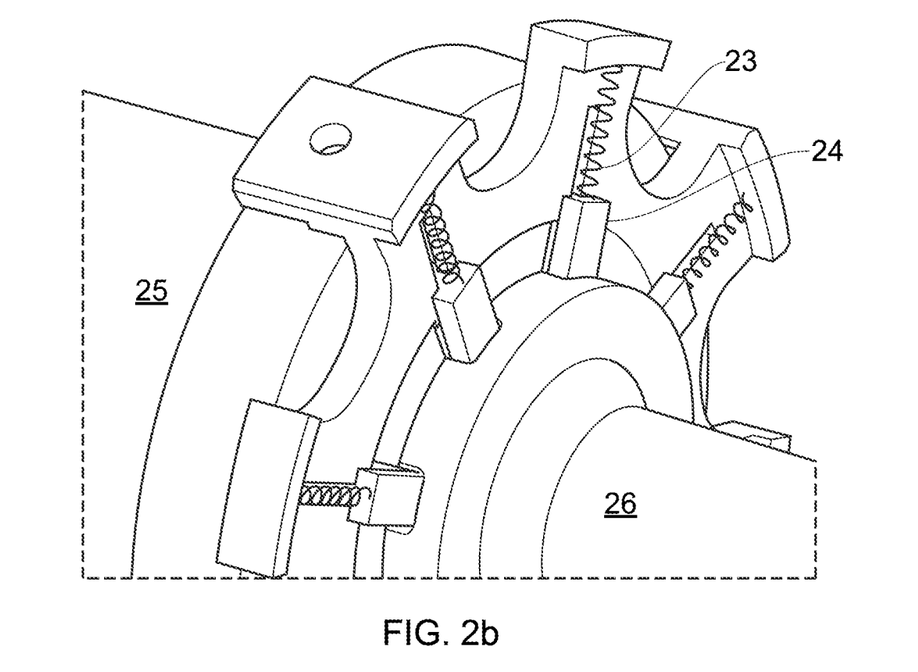
FIG. 2b is a partial perspective schematic diagram of an externally locking telescopic actuator in a locked state.
Figure 3A:
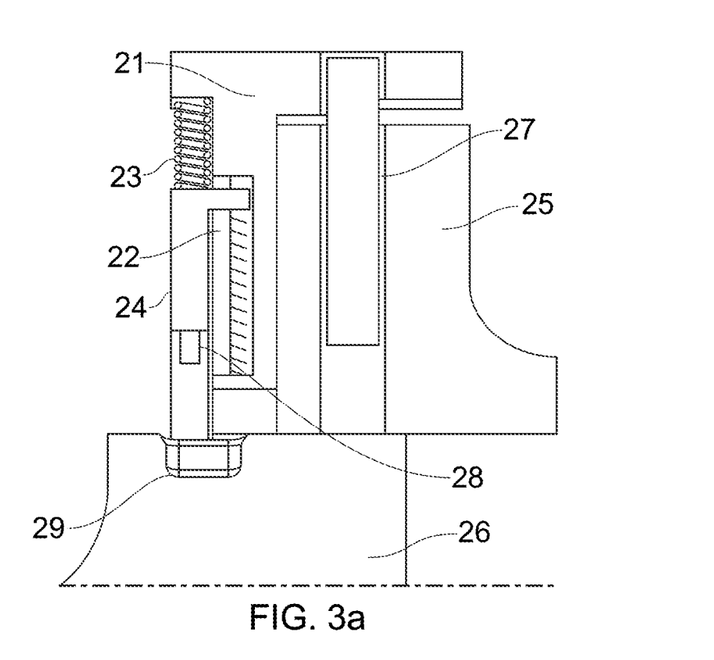
FIG. 3a is a cross sectional diagram of an externally locking telescopic actuator with shape memory alloy in an unlocked state.
Figure 3B:
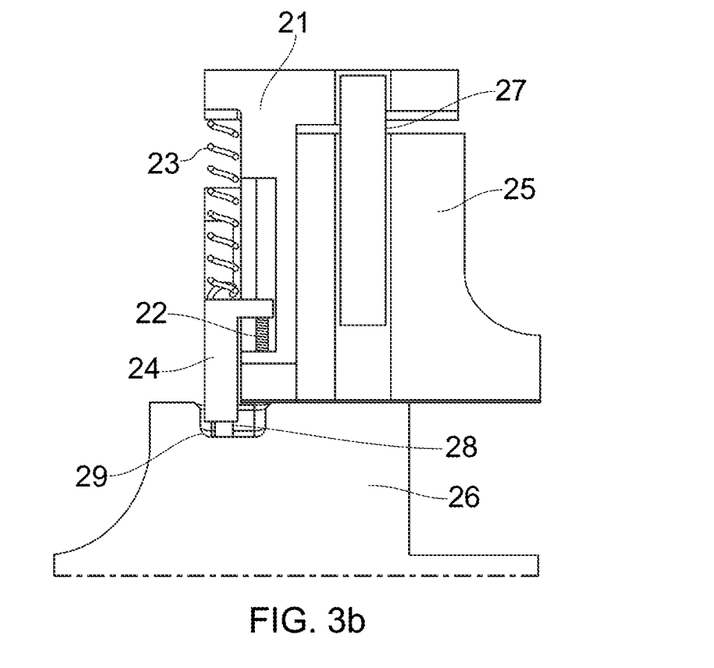
FIG. 3b is a cross sectional diagram of an externally locking telescopic actuator with shape memory alloy in a locked state.

FIGS. 2a and 2b are perspective schematic diagrams of a telescopic actuator 20 according to another embodiment of the invention, wherein the locking mechanism of the lockable telescoping actuator in not located in the cylindrical cavity but is mounted externally on the body. FIGS. 3a and 3b are cross-sectional representations of the embodiment presented in FIGS. 2a and 2b accordingly. FIGS. 2a and 3a illustrate the externally locking telescoping actuator in the unlocked state, while FIGS. 2b and 3b illustrate the externally locking telescoping actuator in the locked state.

The telescopic actuator 20 comprises a piston 26 mounted to slide telescopically in the cylindrical cavity of the body 25, commonly known as a sliding piston. The piston 26 may comprise dynamic seals 27 (not shown) to reduce the possibility of leaking of gas or fluids contained in the telescopic actuator.

The telescopic actuator 20 comprises a locking mechanism mounted on a housing 21. The housing 21 is attached on the external surface of the body 25 with a pin 27, although in other embodiments the housing 21 may be attached on the body in other manners. In the embodiment illustrated in FIGS. 2a-3b, the housing 21 surrounds the body 25, although in other embodiments the housing 21 may be in contact with only a small part of the external surface of the body 25. The locking mechanism comprises a first locking segment 24, a first SMA biasing element 22 and a second SMA biasing element 23.

As can be seen in FIGS. 2a and 2b the telescopic actuator may have multiple locking mechanisms mounted on the housing 21 radially with respect to the longitudinal axis of the piston 26, such that they surround the piston 26, with each locking mechanism comprising a respective first locking segment, a first SMA biasing element and a second SMA biasing element.

The first locking segment 24 is slidably engaged to the housing 21 through the first SMA biasing element 22 and the second SMA biasing element 23. The first SMA biasing element 22 is arranged between the housing 21 and the first locking segment 24 such that when the first SMA biasing element 22 is selectively extended the first locking element 24 is moved away from the piston 26 while when the first SMA biasing element 22 is selectively compressed the first locking element 24 is moved towards the piston 26. The second SMA biasing element 23 is arranged between the housing 21 and the first locking segment 24 such that when the second SMA biasing element 23 is selectively compressed the first locking element 24 is moved away from the piston 26 while when the second SMA biasing element 23 is selectively extended the first locking element 24 is moved towards the piston 26.

The piston 26 comprises on its surface at least one recess or slot 29. In the embodiment illustrated in FIGS. 2a-3b the first locking segment 24 is arranged such that it can move from being at least partially inserted in the recess 29 to be entirely out of the recess 29. In a first state, when the first locking segment 24 is at least partially inserted in the recess 29 the piston is prevented from moving relative to the body 25. In this first state, the first locking segment 24 is in a locked position and the lockable telescopic actuator is in a locked state. In a second state, when the first locking segment 24 is entirely out of the recess 29, the piston 26 is allowed to move relative to the body 25. In the second state the first locking segment 24 is in an unlocked position and the lockable telescopic actuator is in an unlocked state.

In the embodiment described in FIGS. 2a-3b, the first locking segment 24 is shaped as a cuboid, although in other embodiments the first locking segment 24 may be shaped as a pin or have other appropriate shapes such that it conforms to the shape of the recess 29.

In operation, the telescopic actuator may initially be in the unlocked state as described above when a controller (not shown) enables a current source (not shown) to provide a first current to the first SMA biasing element 22 such that the first SMA biasing element 22 is maintained at a respective predefined first temperature, while providing a second current to the second SMA biasing elements 23 such that the second SMA biasing elements 23 is maintained at a respective predefined second temperature. At the predefined first temperature the first SMA biasing element 22 is extended and at the predefined second temperature the second biasing elements 23 is compressed, thus biasing the first locking segment 24 in the unlocking position and allowing the piston 26 to move relative to the body 25.

When there is a need to lock the telescopic actuator, the controller enables the current source to provide a respective predefined third current to the first SMA biasing element 22, wherein the respective third current is less than the respective first current, such that the first SMA biasing element 22 is cooled at a respective predefined third temperature, while providing a respective predefined fourth current to the second SMA biasing element 23, wherein the respective fourth current is greater than the respective second current such that the second SMA biasing elements 23 is heated at a respective predefined fourth temperature. The cooling of the first SMA biasing element 22 causes the first SMA biasing element 22 to compress, while the heating of the second SMA biasing elements 23 causes the second SMA biasing element 23 to extend, biasing the first locking segments 24 in the locking position and preventing the piston 26 to move relative to the body 25.

When there is a need to unlock the telescopic actuator, the controller enables the current source to provide the respective predefined first current to the first SMA biasing element 22, thus extending the first SMA biasing element 22, and to provide the respective predefined second current to the second SMA biasing elements 23, thus compressing the second SMA biasing element 23. Extending the first SMA biasing element 22 and compressing the second SMA biasing element 23 biases the first locking segment 24 back to the unlocked position, allowing the piston 26 to move relative to the body 25.

Advantageously as the first SMA biasing element 22 and the second biasing element 23 separately can bias the first locking segment 24 between the locked and the unlocked position, the actuator benefits from improved redundancy and reliability. In other words, even if the first biasing element 22 fails, the second biasing element 23 will still be able to move the first locking segments 24 to engage or disengage with the piston 26, and vice versa.

The first locking segment 24 may comprise an indication switch 28 on a surface facing the recess 29. The indication switch 28 is configured to be activated when the first locking segment enters the recess 29 and deactivated when the first locking segment is out of the recess 29 or vice versa. The indication switch 28 may be part of a feedback mechanism (not shown) that comprises the current source, thus providing a single centralised system that verifies that the heating or cooling of the SMA has reached the desired levels based on the output of the indication switch 28 that provides feedback of whether the telescopic actuator is in the locked state or in the unlocked state.

Although in the embodiment described above the current source changes the amplitude of the current supplied to the SMA biasing elements, in other embodiments, the current source may be configured to provide current pulses of fixed amplitude, and the cooling or heating of the SMA biasing elements may be adjusted by the current source changing the frequency of the current sources.

Advantageously in the above locking mechanisms, locking and unlocking the actuator is controlled by electrical means thus requiring fewer moving parts than known purely mechanical locking mechanisms, and thus enjoy improved reliability, reduced weight, and easier maintenance when compared with known lockable telescopic actuators, which are all significant advantages in aerospace applications.

Furthermore, in embodiments of the invention comprising multiple SMA biasing elements, for example as illustrated in the figures, actuation of the locking segments can be based solely on any one of the SMA biasing elements. The system thus benefits from redundancy and improved reliability.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A lockable telescopic actuator arranged to be in a locked state or in an unlocked state, the lockable telescopic actuator comprising:

a body defining a cylindrical cavity;
a piston mounted to slide telescopically in the cylindrical cavity; and
a locking mechanism comprising
a first locking segment, the first locking segment arranged to be movable between a locked position and an unlocked position, wherein
in the locked position the first locking segment is engaged with the piston to prevent the piston from moving relative to the body and
in the unlocked position the first locking segment is disengaged from the piston to allow the piston to move relative to the body; and
a first shape memory alloy, SMA, biasing element configured to be selectively extended or compressed, the first SMA biasing element arranged such that when the first SMA biasing element is selectively compressed, the first locking segment is biased into the locked position and when the first SMA bias element is selectively extended, the first locking element is biased into the unlocked position,
wherein the locking mechanism is located in the cylindrical cavity and further comprises
a second locking segment, the second locking segment arranged to be movable between a locked position and an unlocked position, wherein
in the locked position the second locking segment is engaged with the piston to prevent the piston from moving relative to the body and
in the unlocked position the second locking segment is disengaged from the piston to allow the piston to move relative to the body; and wherein
the first SMA biasing element is located between the first and second locking segments and arranged such that when the first SMA biasing element is selectively compressed, the second locking element is biased into the locked position and when the first SMA bias element is selectively extended, the second locking element is biased into the unlocked position,
comprising a second SMA biasing element arranged between the body and the first locking segment and a third SMA biasing element arranged between the body and the second locking segment, the second and third SMA biasing elements configured to be selectively extended or compressed and arranged to:
compress when the first SMA biasing element extends; and
extend when the first SMA biasing element compresses.

2. A lockable telescopic actuator according to claim 1, wherein the piston includes a recess formed therein and wherein
in the locked position the first locking segment is at least partially inserted in the recess; and
in the unlocked position the first locking segment is out of the recess.

3. A lockable telescopic actuator according to claim 1, wherein the piston and/or the first locking segment comprises an indication switch that is:
activated when the first locking segment is engaged with the piston; and
deactivated when the first locking segment is disengaged with the piston.

4. A lockable telescopic actuator according to claim 1, wherein the first SMA biasing element is arranged to extend when at a first predefined temperature and to compress when at a second predefined temperature.

5. A lockable telescopic actuator according to claim 1, wherein the first SMA biasing element is electrically coupled to a current source.

6. A landing gear for an aircraft, comprising a lockable telescopic actuator according to claim 1.

7. A lockable telescopic actuator arranged to be in a locked state or in an unlocked state, the lockable telescopic actuator comprising:
a body defining a cylindrical cavity;
a piston mounted to slide telescopically in the cylindrical cavity; and
a locking mechanism comprising
a first locking segment, the first locking segment arranged to be movable between a locked position and an unlocked position, wherein
in the locked position the first locking segment is engaged with the piston to prevent the piston from moving relative to the body and
in the unlocked position the first locking segment is disengaged from the piston to allow the piston to move relative to the body; and
a first shape memory alloy, SMA, biasing element configured to be selectively extended or compressed, the first SMA biasing element arranged such that when the first SMA biasing element is selectively extended, the first locking segment is biased into the locked position and when the first SMA bias element is selectively compressed, the first locking element is biased into the unlocked position,
wherein the locking mechanism is mounted on a housing attached on an external surface of the body, the first SMA biasing element being located between the housing and the first locking segment, wherein the first locking segment is slidably engaged with the housing, and
wherein the lockable telescopic actuator further comprised a second SMA biasing element located between the housing and the first locking segment, the second SMA biasing element configured to be selectively extended or compressed, the second SMA biasing element arranged:
to compress when the first SMA biasing element extends; and
to extend when the first SMA biasing element compresses.

8. A lockable telescopic actuator according to claim 7, wherein the piston includes a recess formed therein and wherein
in the locked position the first locking segment is at least partially inserted in the recess; and
in the unlocked position the first locking segment is out of the recess.

9. A lockable telescopic actuator according to claim 7, wherein the piston and/or the first locking segment comprises an indication switch that is:
activated when the first locking segment is engaged with the piston; and
deactivated when the first locking segment is engaged with the piston.

10. A lockable telescopic actuator according to claim 7, wherein the first SMA biasing element is arranged to extend when at a first predefined temperature and to compress when at a second predefined temperature.

11. A lockable telescopic actuator according to claim 7, wherein the first SMA biasing element is electrically coupled to a current source.

12. A landing gear for an aircraft, comprising a lockable telescopic actuator according to claim 7.

13. A lockable telescopic actuator arranged to be in a locked state or in an unlocked state, the lockable telescopic actuator comprising:
  a body defining a cylindrical cavity;
  a piston mounted to slide telescopically in the cylindrical cavity; and
  a locking mechanism comprising:
    a first locking segment, the first locking segment arranged to be movable between a locked position and an unlocked position, wherein
      in the locked position the first locking segment is engaged with the piston to prevent the piston from moving relative to the body and
      in the unlocked position the first locking segment is disengaged from the piston to allow the piston to move relative to the body;
  a first shape memory alloy, SMA, biasing element configured to be selectively extended or compressed, the first SMA biasing element arranged such that when the first SMA biasing element is selectively extended, the first locking segment is biased into the locked position and when the first SMA bias element is selectively compressed, the first locking element is biased into the unlocked position;
  wherein the locking mechanism is located in the cylindrical cavity and comprises
  a second locking segment, the second locking segment arranged to be movable between a locked position and an unlocked position, wherein
    in the locked position the second locking segment is engaged with the piston to prevent the piston from moving relative to the body and
    in the unlocked position the second locking segment is disengaged from the piston to allow the piston to move relative to the body; and
  a second SMA biasing element configured to be selectively extended or compressed, the second SMA biasing element arranged such that when the first SMA biasing element is selectively extended, the second SMA biasing element is selectively extended and the second locking element is biased into the locked position and when the first SMA bias element is selectively compressed, the second SMA biasing element is selectively compressed and the second locking element is biased into the unlocked position
  wherein the first SMA biasing element is between the body and the first locking segment and the second SMA biasing element is between the body and the second locking segment.

14. A lockable telescopic actuator according to claim 13, wherein the piston includes a recess formed therein and wherein
  in the locked position the first locking segment is at least partially inserted in the recess; and
  in the unlocked position the first locking segment is out of the recess.

15. A lockable telescopic actuator according to claim 13, wherein the piston and/or the first locking segment comprises an indication switch that is:
  activated when the first locking segment is engaged with the piston; and
  deactivated when the first locking segment is disengaged with the piston.

16. A lockable telescopic actuator according to claim 13, wherein the first SMA biasing element is arranged to extend when at a first predefined temperature and to compress when at a second predefined temperature.

17. A lockable telescopic actuator according to claim 13, wherein the first SMA biasing element is electrically coupled to a current source.

18. A landing gear for an aircraft, comprising a lockable telescopic actuator according to claim 13.

* * * * *